(12) United States Patent
Petschnigg et al.

(10) Patent No.: US 8,319,736 B2
(45) Date of Patent: Nov. 27, 2012

(54) TOUCH SENSITIVE COMPUTING DEVICE AND METHOD

(75) Inventors: Georg Petschnigg, Seattle, WA (US); Jonathan Reed Harris, Redmond, WA (US); Joshua J. Hinds, Duvall, WA (US); Sabrina Boler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 12/356,045

(22) Filed: Jan. 19, 2009

(65) Prior Publication Data
US 2010/0182246 A1 Jul. 22, 2010

(51) Int. Cl.
*G06F 3/041* (2006.01)
(52) U.S. Cl. .......................... 345/173; 345/156; 715/863
(58) Field of Classification Search .................. 715/863
See application file for complete search history.

(56) References Cited

U.S. PATENT DOCUMENTS

| | | | |
|---|---|---|---|
| 6,335,725 B1 * | 1/2002 | Koh et al. | 345/173 |
| 6,459,442 B1 | 10/2002 | Edwards et al. | |
| 6,525,749 B1 | 2/2003 | Moran et al. | |

(Continued)

FOREIGN PATENT DOCUMENTS

| KR | 1020080023566 A | 3/2008 |
|---|---|---|
| KR | 1020080068495 A | 7/2008 |

OTHER PUBLICATIONS

"International Search Report", Mailed Date: Aug. 13, 2010, Application No. PCT/US2009/069321, Filed Date: Dec. 22, 2009, pp. 9.

(Continued)

*Primary Examiner* — Van Chow
(74) *Attorney, Agent, or Firm* — Alleman Hall McCoy Russell & Tuttle LLP (57) ABSTRACT

Touch sensitive computing systems and methods are provided. The touch sensitive computing device may include a touch sensitive display configured to receive a touch input. A gesture recognition module may be coupled with the touch sensitive display, and may be configured to receive the touch input. The gesture recognition module may also be configured to determine, based on the touch input, and by selecting from a plurality of different predefined gestures, a recognized gesture that corresponds to the touch input. The touch sensitive computing device may also include a personal information management (PIM) module including a PIM database. The PIM module may be configured to apply a selected item shown on the touch sensitive display to a selected one of a plurality of different PIM schemas of the PIM database. The selected one of the PIM schemas may be selected based on the recognized gesture.

19 Claims, 5 Drawing Sheets

U.S. PATENT DOCUMENTS

| | | | |
|---|---|---|---|
| 6,952,803 B1 | 10/2005 | Bloomberg et al. | |
| 7,137,077 B2 | 11/2006 | Iwema et al. | |
| 7,262,785 B2 | 8/2007 | Silverman et al. | |
| 7,409,633 B2 | 8/2008 | Lerner et al. | |
| 7,475,487 B1 * | 1/2009 | Johnson | 33/512 |
| 8,018,431 B1 * | 9/2011 | Zehr et al. | 345/156 |
| 2002/0114516 A1 | 8/2002 | Aharonson | |
| 2003/0131059 A1 | 7/2003 | Brown et al. | |
| 2004/0119762 A1 | 6/2004 | Denoue et al. | |
| 2004/0186729 A1 * | 9/2004 | Park et al. | 704/276 |
| 2005/0147953 A1 * | 7/2005 | Ho | 434/317 |
| 2005/0289452 A1 | 12/2005 | Kashi et al. | |
| 2010/0162165 A1 * | 6/2010 | Addala et al. | 715/810 |
| 2010/0257075 A1 * | 10/2010 | Fujimoto | 705/30 |

OTHER PUBLICATIONS

Igarashi, et al."An Architecture for Pen-based Interaction on Electronic Whiteboards", Retrieved at<<http://citeseerx.ist.psu.edu/viewdoc/summary?doi=10.1.1.13.600>>, AVI 2000, Palermo, Italy, pp. 68-75.

Moran, et al."Implicit Structures for Pen-Based Systems within a Freeform Interaction Paradigm", Retrieved at<<http://www.dgp.toronto.edu/~gordo/papers/CHI95_ImplicitStructures.pdf>>, pp. 1-8.

ISA European Patent Office, Extended European Search Report of EP09838574, Jul. 24, 2012, Germany, 6 pages.

* cited by examiner

TOUCH SENSITIVE COMPUTING DEVICE AND METHOD

BACKGROUND

User interfaces for computing devices are often rigid and complex. Users may be required to navigate multiple layers to perform a task, record thoughts, organize information, or access content. Current user interfaces typically lack the flexibility and ease of use available with a simple analogue journal. As a result users often still rely on pen and paper for unstructured writing, sketching, note taking, and calendaring in everyday life. Users may also spend time copying and/or translating information form a paper-based format into a digital form, for example, by inputting the information into a computing device.

SUMMARY

Touch sensitive computing systems and methods are provided. The touch sensitive computing device/system may include a touch sensitive display configured to receive a touch input. A gesture recognition module may be coupled with the touch sensitive display, and may be configured to receive the touch input. The gesture recognition module may also be configured to determine, based on the touch input, and by selecting from a plurality of different predefined gestures, a recognized gesture that corresponds to the touch input. The touch sensitive computing device may also include a personal information management (PIM) module including a PIM database. The PIM module may be configured to apply a selected item shown on the touch sensitive display to a selected one of a plurality of different PIM schemas of the PIM database. The selected one of the PIM schemas may be selected based on the recognized gesture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
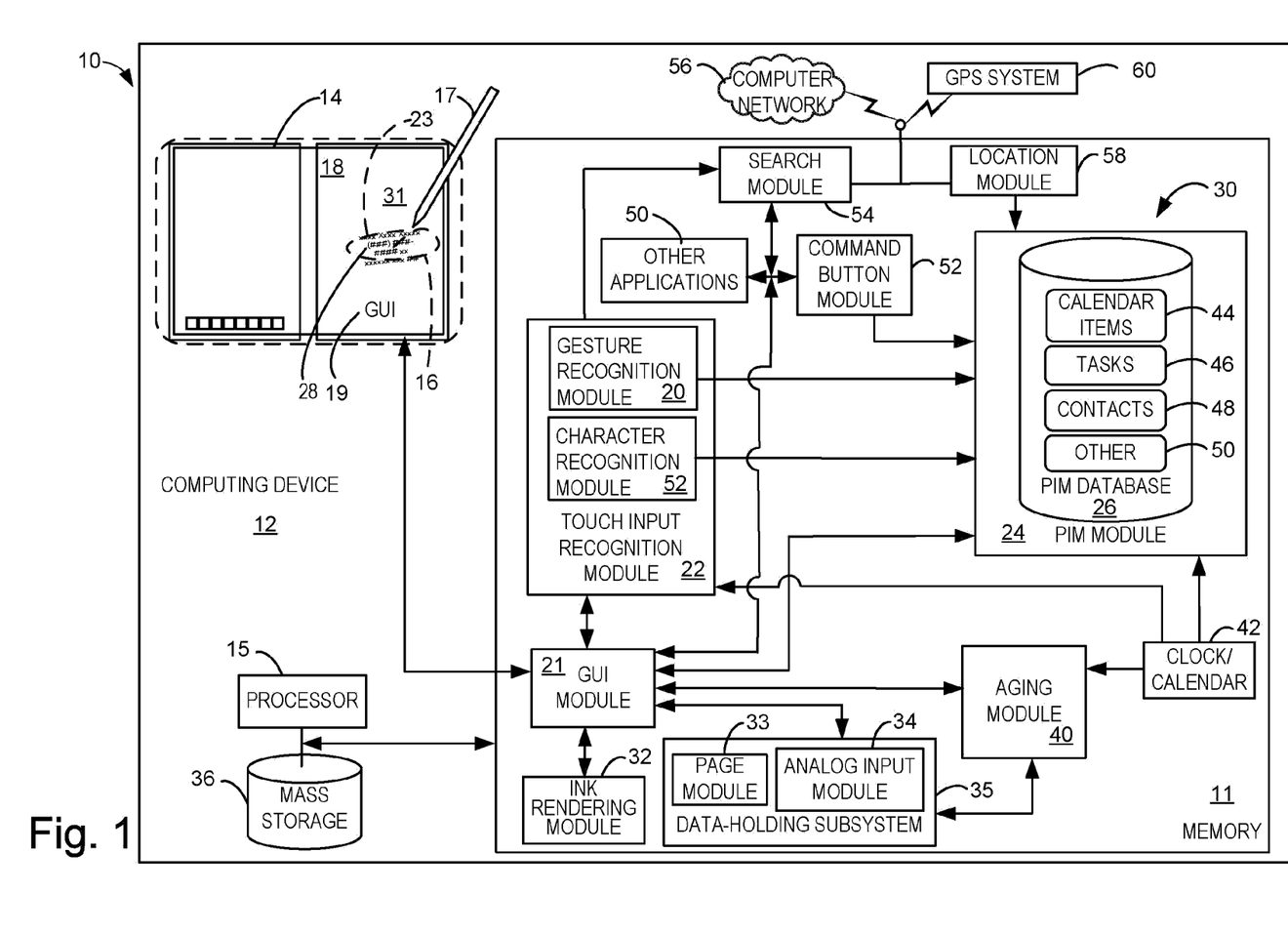
FIG. 1 is a system diagram illustrating a freeform interaction architecture in accordance with the present disclosure.

FIG. 1 is a system diagram illustrating a freeform interaction architecture 10 that may be used with a computing device 12. In some examples, the architecture 10 may include modules. The modules may be software modules that may reside in a memory 11. A processor 15 may be configured to execute the software modules. The architecture 10 may utilize a touch sensitive display 14 that may be configured to receive a touch input 16 on, for example, a surface 18 of the touch sensitive display 14. A graphical user interface 19 may be configured to provide various features to help a user provide input to the computing device 12, and/or to provide feedback and information to a user. The graphical user interface 19 may be coupled with the software modules via a GUI module 21.

The touch input 16 is illustrated here with a generally oval shape in dashed line. A gesture recognition module 20 may be coupled with the touch sensitive display 14, and configured to receive the touch input 16, and to determine, based on the touch input 16 and by selecting from a plurality of predefined freeform gestures a recognized gesture 23, also with the generally oval shape in dashed line. The gesture recognition module 20 may be included as part of a touch input recognition module 22. A personal information management (PIM) module 24 may be coupled with the gesture recognition module 20. The PIM module 24 may include a PIM database 26. The PIM module 24 may be configured to apply a selected item 28 shown on the touch sensitive display 14 to a selected one of a plurality of different PIM schemas 30 of the PIM database 26. The selected one of the PIM schemas 30 may be selected based on the recognized gesture 23. In some cases, when the selected item 28 is applied the selected item 28 may also be saved in a mass storage 36. The plurality of PIM schemas 30 may include one or more of a calendar item 44, a task item 46, and a contact item 48. Other PIM schemas 50 may be included. Note, in some cases, as when the selected item 28 includes markings made by a user, the touch input 16 may generally be considered to include both the selected item 28 and the gesture made with an input device 17. In this illustrated example the touch input 16 may be considered as being made after the selected item 28 is present. It will also be understood that the selected item 28 may be from various forms of input.

A character recognition module 52 may be configured to recognize alphanumeric characters that may be included with the touch input 16 upon recognition of the recognized gesture 23. The character recognition module 52 may also be configured to cause the PIM module 24 to save the alphanumeric characters into the PIM database 26 as a searchable item. The character recognition module 52 may also be configured to cause the alphanumeric characters to be saved in the mass storage 36.

In some examples, the touch sensitive display 14 may be configured to display the selected item 28 on the touch sensitive display 14 within a journal page graphic 31. As mentioned, the selected item 28 may be the result of an earlier touch input 16 made with the input device 17. Various objects may serve as an input device, such as a pen, or a stylus, or a finger, or the like. The input may be, or include anything that may be possible to add to a piece of paper with, for example, a pen, or a pencil. For example, without limitation, markings such a drawing, a doodle, a note, an address, numbers and the like. In addition other items may be included such photos, or digital documents, and the like. The other items may be, for example, without limitation, inputted into the computing device 12, created by the computing device 12, or retrieved from the mass storage 36.

The computing device 12 may include an ink rendering module 32 configured to display the selected item 28 as part of a selected journal page graphic 31 as a marked-up journal page graphic. The ink rendering module 32 may also provide the user with selectable choices, such as line type, line width and line color.

A data-holding subsystem may be operatively coupled with the touch sensitive display 14 and may be configured to hold a plurality of journal page graphics. The plurality of journal page graphics may be a plurality of hierarchically flat sequentially arranged journal page graphics 70 discussed below. An analog input module 34 may be included in the data-holding subsystem, and may be configured to cause the marked-up journal page graphic to be saved in the mass storage 36. A page module 33 may provide additional journal page graphics 31, and/or may order the journal page graphics 31.

The computing device 12 may also include an aging module 40 operatively coupled with the touch sensitive display 14 and the data holding subsystem. The aging module may provide what may be referred to as paper physics. The aging module 40 may be configured to display each of the journal page graphics 30 on the touch sensitive display 14 as a paper page from a paper journal. The aging module 40 may be configured to selectively control display of aging characteristics to the journal page graphic 31. The aging characteristics may be variably applied. The aging characteristics of each journal page may be based on at least one of an age of such journal page and an amount of usage associated with such journal page. In some examples, the selected journal page graphic 31 may be configured to change appearance in accordance with one, or both, of an elapsed time from a creation of the selected journal page graphic 31, or a cumulative duration of a time since the journal page graphic received a first touch input 16. A clock/calendar module 42 may provide a measure of the duration of time.

The architecture 10 may also be configured to execute various other applications 50. The other application 50 may be executable upon recognition of other predefined gestures. As an Alternative to, or in addition to, using gesture recognition to execute the various other applications 50, or to apply one or more selected items 28 on the touch sensitive display 14 to a selected one of the plurality of different PIM schemas 30 as described, various command buttons 52 may be used. The various other applications 50, and or the applying of different PIM schemas 30 may also utilize a search module 54. The search module 54 may be coupled with, or able to be coupled with, a computer network 56, such as, for example, the Internet.

In addition, the architecture 10 may include a location module 58 coupled with, or able to be coupled with, a GPS system 60. A particular location where a user was located when a particular touch input 16 was made may be saved in the PIM database 26, and or the mass storage 36. The location of the computing device 12 when an input was made, may then later, be included as part of various search criteria that may be used to recall an item included in a PIM schema 30. In addition, or alternatively, the location of where any particular touch input 16 was made, whether part of a PIM schema 30 or not, may be used to locate a particular journal page graphic 31. This may be useful, for example, if a user is able to remember where they were when an input was made, such as on a trip, or at a meeting, but can not find the particular journal page. This may be akin to helping a user find a particular one page in a large paper journal based on the user's memory of where they were when they wrote down, or sketched something, but would otherwise have to thumb through most, or all of the paper journal to find it. In addition, or as an alternative, to using geographic cues to find a particular journal page, the user of the computing device 12, described herein, may use various other sensory cues such as the age, and/or general appearance of a journal page graphic 31. The architecture 10, computing device 12, and methods, described herein may be configured to provide these sensory cues.

Figure 2:
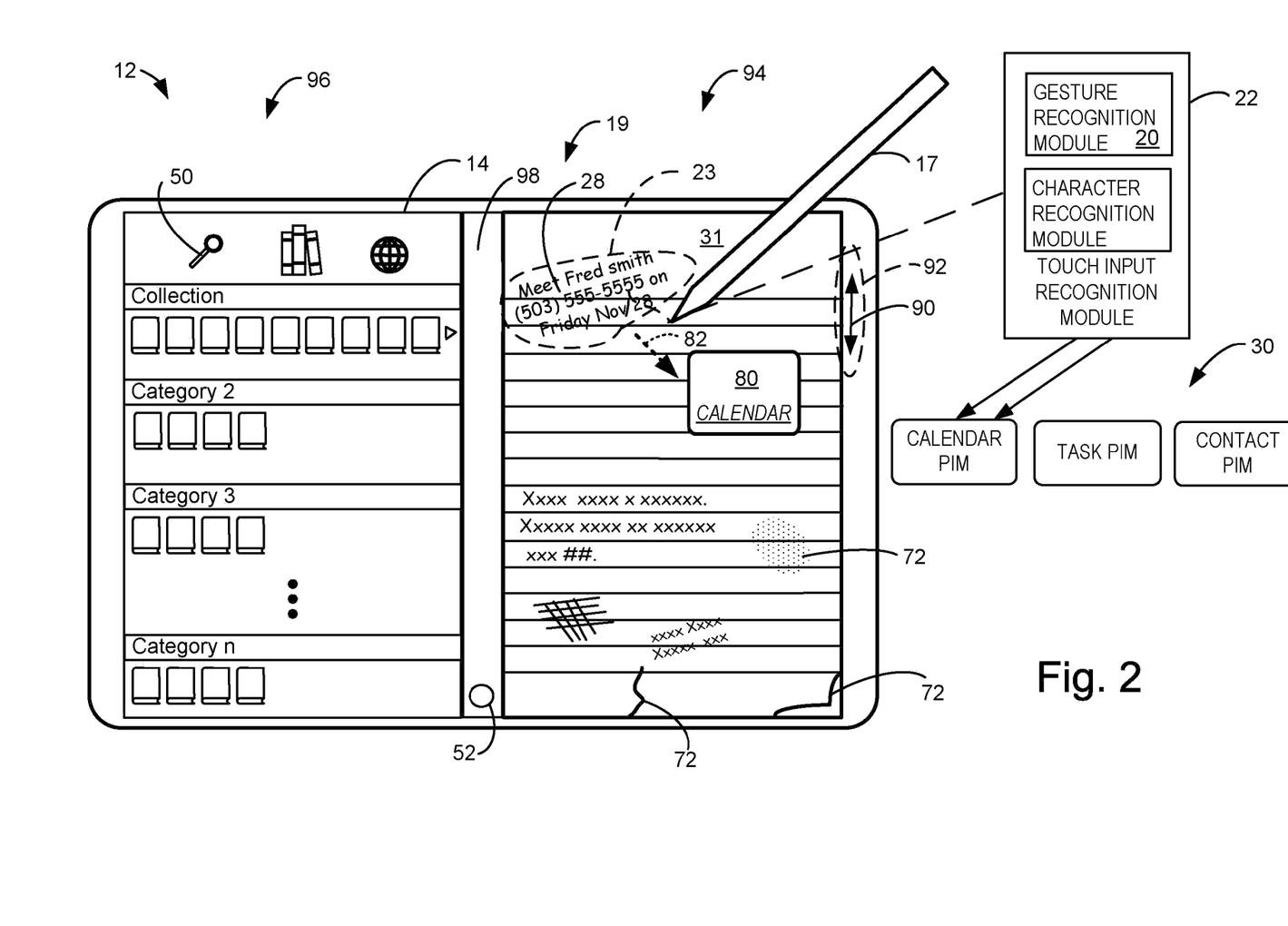
FIG. 2 is a schematic illustration of a computing device that may include the freeform interaction architecture illustrated in FIG. 1.
Figure 3:
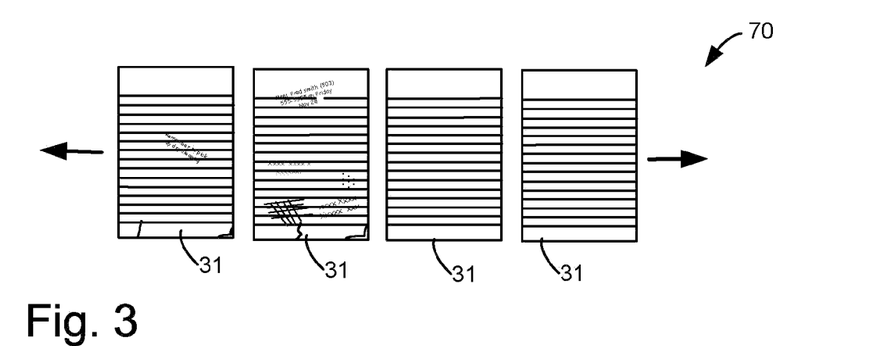
FIG. 3 is a schematic view illustrating a plurality of hierarchically flat sequentially arranged journal pages that may be selectively displayed on the computing device illustrated in FIG. 2.

FIG. 2 is a schematic illustration of a computing device 12 that may be used for receiving and saving analog input from an input device 17, and/or digital input. FIG. 3 is a schematic view illustrating a plurality of hierarchically flat sequentially arranged journal pages 70. The computing device 12 may include a user interface 19 configured to selectively display the plurality of hierarchically flat sequentially arranged journal pages 70 on a touch sensitive display 14. One journal page graphics 31 is shown in FIG. 2. The user interface 19 may be configured to apply a selected item 28 on a selected one of the journal page graphics 31 to a selected one of a plurality of PIM schemas 30 in response to a touch input 16 applied to the touch sensitive display 14. This may occur upon recognizing a predefined freeform gesture, as a recognized gesture 23, made with the input device 17. The computing device 12 may include an aging module 40 (FIG. 1) configured to control aging appearance characteristics for each touch input 16 applied to the touch sensitive display 14. Each of the journal page graphics 31 may be configured to appear on the touch sensitive display 14 as a paper page from a paper journal. The aging module 40 may be configured to redisplay selected journal page graphics 31 at one or more later times with predetermined graphical modifications 72 according to predetermined temporal conditions and/or predetermined use conditions. The predetermined graphical modifications 72 may be included as sensory cues to enhance the journaling experience, and as aids to recall, as discussed.

The selected journal page graphic 31 may be configured to change appearance, i.e. with the addition of the predetermined graphical modifications 72, in accordance with one, or both, of an elapsed time from a creation of the selected journal page graphic, or a cumulative duration of a time that the journal page graphic has been selected among the plurality of hierarchically flat sequentially arranged journal pages 70. The predetermined temporal conditions may include a duration from a first use of the selected one of the journal page graphics, and the predetermined use conditions include a can amount of use incurred by the selected one of the journal page graphics.

The use module 40 may be configured to add an appearance of one or more of discoloration such as yellowing, smudges, crinkles, wrinkles, rips, smudges, soil marks, and folds to the selected journal page graphic 31 in accordance with the cumulative duration as the selected journal page graphic 31, and/or a cumulative amount of analog input having been made to the computing device while the journal page graphic is the selected one of the journal page graphics 31.

In some cases, upon recognizing a predefined freeform gesture 23, the user interface 19 may cause one of a plurality of overlay navigational tools to be displayed on the touch sensitive display 14 to help a user navigate the possible actions and reactions of the computing device 12 by verifying its' occurrence. The gesture recognition module 20 may be configured so that upon determination of the recognized gesture 23, the gesture recognition module 20 may causes the touch sensitive display 14 to display verification 80 of the application of the selected item to the selected one of the plurality of PIM schemas. After a preselected time, for example one second, of being visible on the touch sensitive display 14, the verification 80 may disappear. The verification 80 may take various forms, for example a box with a label corresponding to the PIM schema. A navigation arrow 82 may also be included with the verification 80.

In some cases the plurality of hierarchically flat sequentially arranged journal pages 70 may be advanced, or reversed, or otherwise scrolled backward and forward. In some cases this may be accomplished by running a users finger, or another type of input device in an upward or downward direction as illustrated with arrow 90 at location 92. Other activation techniques may be used. The activation techniques may be referred to as a scroll page gesture.

FIG. 2 illustrates an analog input area on a right side 94 of the computing device 12, and various other features on a left side 96. This is an example configuration. In some cases both sides may be configured for analog input. In some cases the left side 96 may be configured for analog input and the right side 94 may be configured to display other features. Left side 96 analog input may be the preferred configuration for a left handed person, and vise versa. The computing device 12 may include a spine 98 between the left side 96 and the right side 94. The computing device 12 may be foldable at the spine similar to a paper journal. An example command button 52 is illustrated on the spine.

Figure 4:
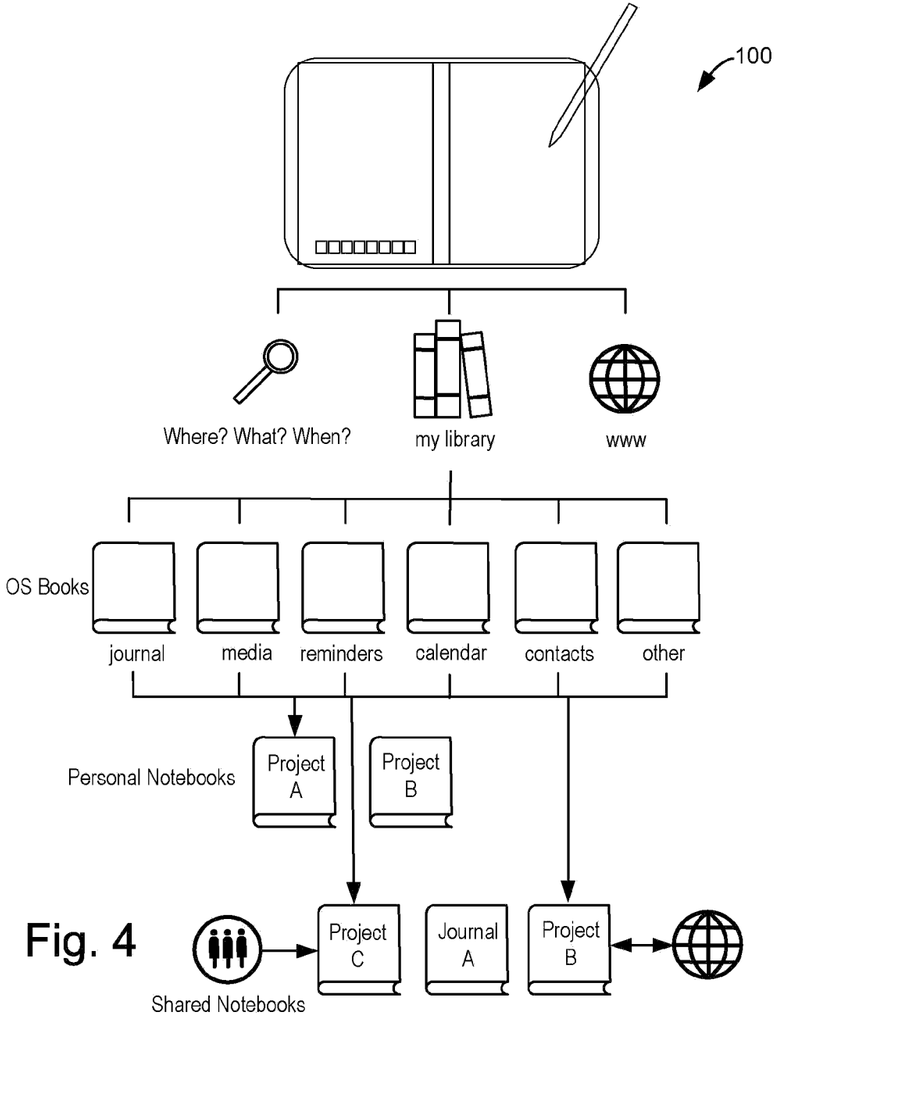
FIG. 4 is a schematic illustration of an example architectural structure in accordance with the present disclosure.

The various other features on the left side 96 of the journal structure illustrated in FIG. 2 may enable various other functions besides those discussed in detail herein. Various features may be, for example selectable icons may be made selectively visible, and may be scrollable. FIG. 4 is a schematic illustration of an example architectural structure 100. The architectural structure 100 illustrates icons that may be selectable to, for example, enable various PIM schemas 30, various other applications 50, or other schemas. In addition, various notebooks, each containing various number of displayable journal page graphics 31 may be selected, by selecting corresponding icons, which may then make the selected notebook visible on the touch sensitive display 14.

Figure 5:
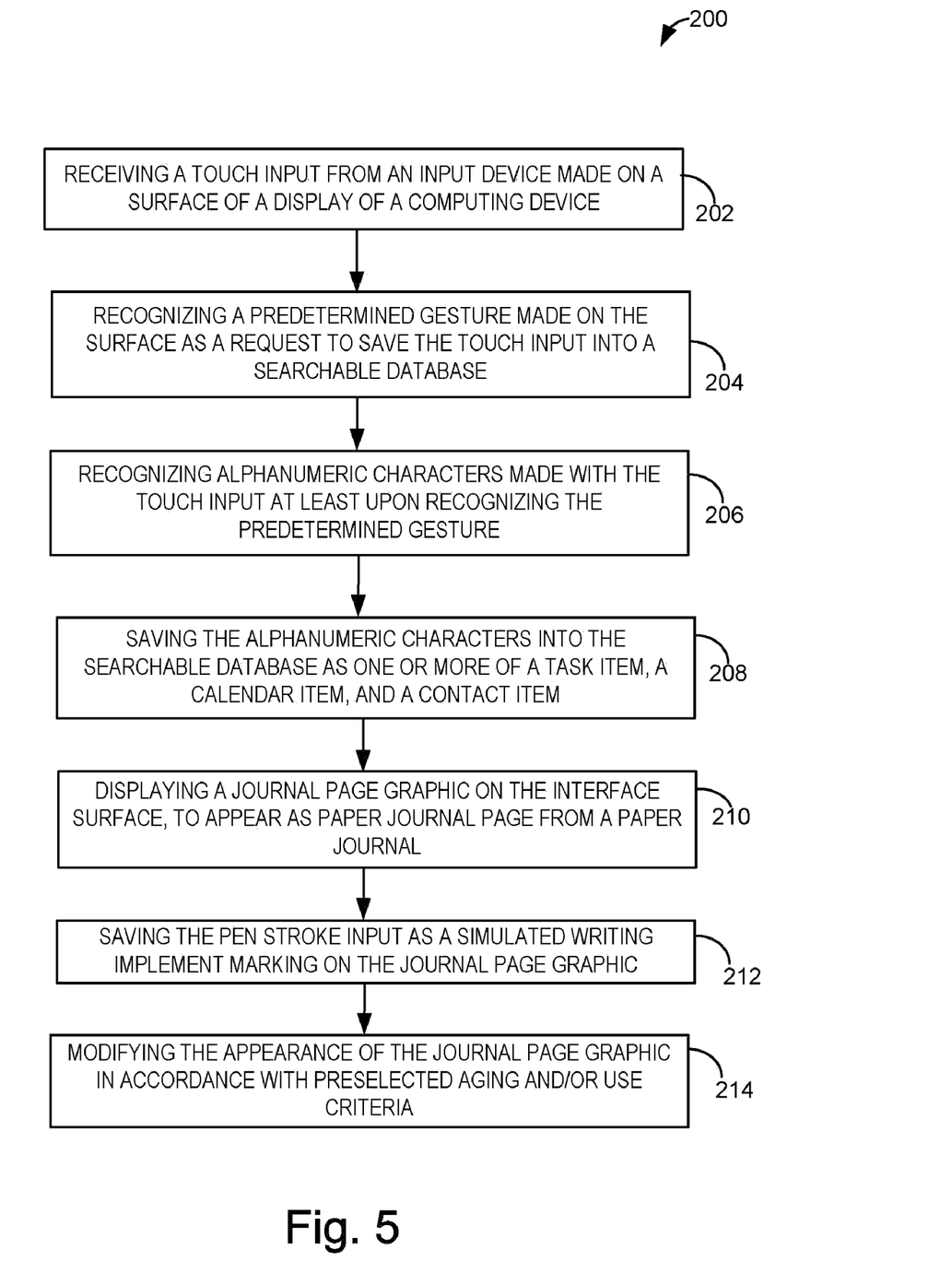
FIGS. 5 through 8 are flowcharts illustrating various example methods for receiving and processing touch inputs in a computing device.

FIG. 5 is a flowchart illustrating an embodiment of a method 200 for receiving and processing touch inputs in a computing device. Method 200 may be implemented using systems and devices described above, or using other suitable hardware and software. The method 200 may include, at 202, receiving a touch input at a touch sensitive display. The touch input may be from an input device made on a surface of a touch sensitive display of a computing device. At 204, the method may also include recognizing a predetermined gesture made on the surface as a request to save the touch input into a searchable database. This may include determining, based on the touch input and by selecting from a plurality of different predefined gestures, a recognized gesture that corresponds to the touch input. The method may include applying a selected item shown on the touch sensitive display to a selected one of a plurality of PIM schemas, the selected one of the PIM schemas being selected based on the recognized gesture. At 206, the method may also include recognizing alphanumeric characters made with the touch input at least upon recognizing the predetermined gesture. At 208, the method may also include saving the alphanumeric characters into the searchable database as one or more of a task item, a calendar item, and a contact item. At 210, the method may also include displaying a journal page graphic on the interface surface, to appear as paper journal page from a paper journal. At 212, the method may also include saving the pen stroke input as a simulated writing implement marking on the journal page graphic. In addition, and 206, the method may also include modifying the appearance of the journal page graphic in accordance with preselected aging, and/or use criteria.

Figure 6:
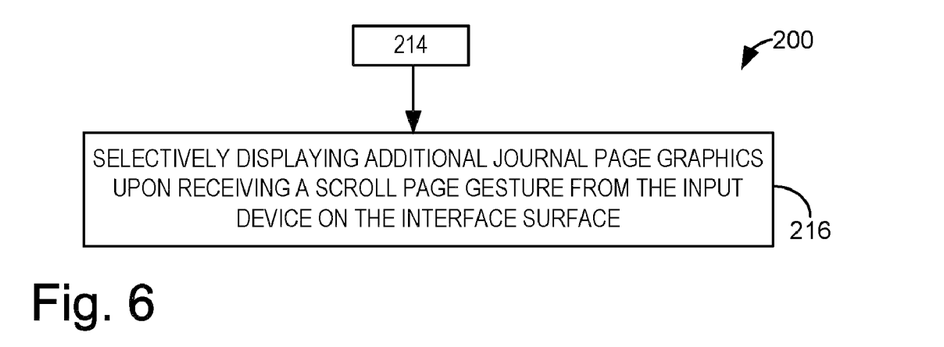

FIG. 6 is a flowchart illustrating an example variation of the method 200 shown in FIG. 5. The method 200 may further include at 216, selectively displaying additional journal page graphics upon receiving a scroll page gesture from the input device on the interface surface. In some cases the additional journal page graphics are from the plurality of hierarchically flat sequentially arranged journal pages 70 shown in FIG. 4.

Figure 7:
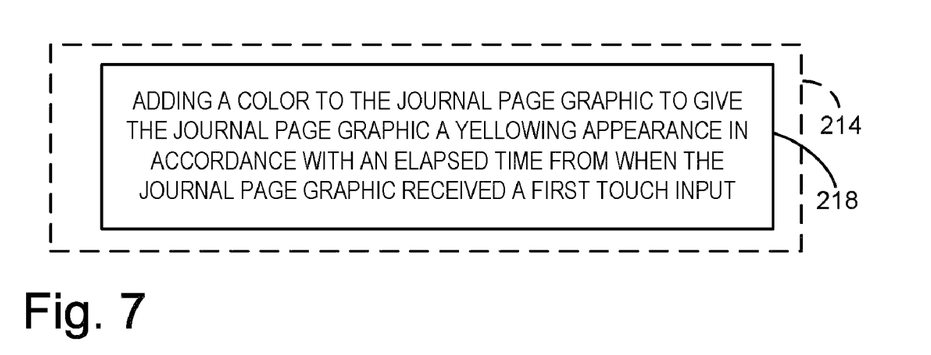

FIG. 7 is a flowchart illustrating another example variation of method 200 shown in FIG. 5. The modifying the appearance 214 (FIG. 5) may include, at 218, adding a color to the journal page graphic to give the journal page graphic a yellowing appearance in accordance with an elapsed time from when the journal page graphic received a first touch input.

Figure 8:
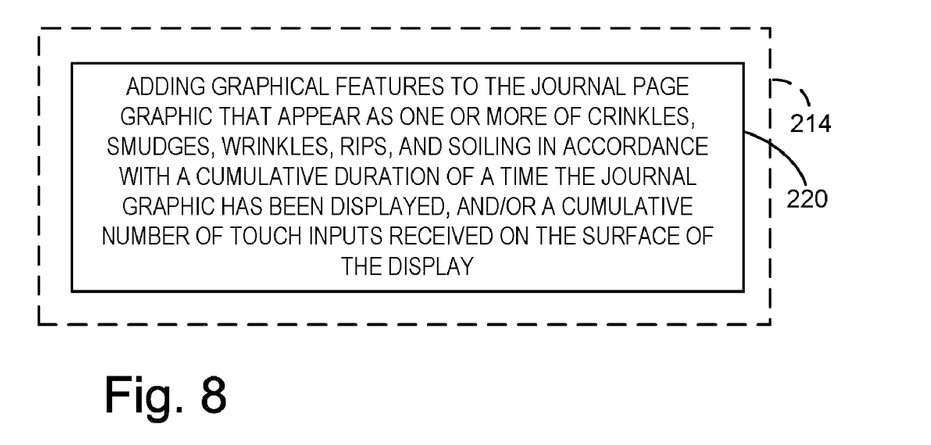

FIG. 8 is a flowchart illustrating another example variation of the method 200 shown in FIG. 5. The modifying the appearance 214 (FIG. 5) may include, at 220, adding graphical features to the journal page graphic that appear as one or more of crinkles, smudges, wrinkles, rips, and soiling in accordance with a cumulative duration of a time the journal graphic has been displayed, and/or a cumulative number of touch inputs received on the surface of the touch sensitive display.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, enhanced mobile telephone device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

The invention claimed is:

1. A touch sensitive computing device, comprising:
   a touch sensitive display configured to receive a touch input;
   a touch input recognition module configured to receive touch input in the form of a marking so that the marking is displayed via the touch sensitive display;
   a gesture recognition module configured to recognize from the touch input a recognized gesture from a plurality of predefined gestures;
   a character recognition module configured to recognize alphanumeric characters from the marking upon recognition of the recognized gesture; and
   a personal information management (PIM) module including a PIM database, the PIM module configured to apply the marking to a selected one of a plurality of different PIM schemas of the PIM database and to save the alphanumeric characters into the PIM database as a searchable item associated with the selected one of the PIM schemas, the selected one of the PIM schemas being selected based on the recognized gesture.

2. The touch sensitive computing device of claim 1, further comprising a data-holding subsystem operatively coupled with the touch sensitive display and configured to hold a plurality of hierarchically flat sequentially arranged journal pages, where the touch sensitive display is configured to selectively display the journal pages, and where the marking is graphically disposed on one of the plurality of journal pages.

3. The touch sensitive computing device of claim 2, further comprising an aging module operatively coupled with the touch sensitive display and the data-holding subsystem and configured to selectively control display of aging characteristics for the plurality of journal pages.

4. The touch sensitive computing device of claim 3, where the aging characteristics are variably applied to the plurality of journal pages and are selected from the group consisting of yellowing, smudges, crinkles, wrinkles, rips, folds, and soil marks.

5. The touch sensitive computing device of claim 3, where for a given one of the plurality of journal pages, the aging module is configured to control aging characteristics of such journal page based on at least one of an age of such journal page and an amount of usage associated with such journal page.

6. The touch sensitive computing device of claim 1, further comprising an ink rendering module configured to display the marking as part of a selected journal page graphic as a marked-up journal page graphic, and an analog input module configured to cause the marked-up journal page graphic to be saved in a mass storage.

7. The touch sensitive computing device of claim 1, where the gesture recognition module is configured so that upon determination of the recognized gesture, the gesture recognition module causes the touch sensitive display to display verification of the application of the marking to the selected one of the plurality of PIM schemas.

8. The touch sensitive computing device of claim 1, where the plurality of PIM schemas include one or more of a calendar item, a task item, and a contact item.

9. The touch sensitive computing device of claim 1, where the user interface is configured to display verification of the application of the marking to the selected one of the plurality of PIM schemas.

10. A touch sensitive computing device, comprising:
a touch sensitive display configured to selectively display a plurality of hierarchically flat sequentially arranged journal page graphics;
a touch input recognition module configured to receive touch input in the form of a marking so that the marking is graphically disposed on a selected one of the plurality of journal page graphics via the touch sensitive display;
a gesture recognition module configured to recognize from the touch input a recognized gesture from a plurality of predefined gestures;
a user interface configured to apply the marking from the selected one of the plurality of journal page graphics to a selected one of a plurality of PIM schemas in response to recognition of the recognized gesture; and
an aging module configured to control aging appearance characteristics for each of the journal page graphics according to predetermined temporal conditions and predetermined use conditions.

11. The touch sensitive computing device of claim 10, further comprising a character recognition module configured to recognize alphanumeric characters in the marking, and to save the alphanumeric characters in a mass storage.

12. The touch sensitive computing device of claim 10, where the plurality of PIM schemas include a calendar schema, a tasks schema and a contacts schema.

13. The touch sensitive computing device of claim 10, where for the selected one of the plurality of the journal page graphics, the predetermined temporal conditions include a duration from a first use of the selected one of the journal page graphics, and the predetermined use conditions include an amount of use incurred by the selected one of the journal page graphics.

14. The touch sensitive computing device of claim 10, where the aging appearance characteristics include graphical journal page depictions selected from the group consisting of yellowing, smudges, crinkles, wrinkles, rips, folds, and soil marks.

15. A method for receiving and processing touch inputs in a computing device, comprising:
receiving a touch input in the form of a marking at a touch sensitive display; recognizing, from the touch input, a recognized gesture from a plurality of predefined gestures; and
applying the marking to a selected one of a plurality of PIM schemas, the selected one of the PIM schemas being selected based on the recognized gesture.

16. The method of claim 15, further comprising:
displaying a journal page graphic on the touch sensitive display, to appear as a paper journal page from a paper journal;
saving the marking as a simulated writing implement marking on the journal page graphic; and
modifying the appearance of the journal page graphic in accordance with preselected aging and/or use criteria.

17. The method of claim 16, further comprising selectively displaying additional journal page graphics upon receiving a scroll page gesture from the input device on the interface surface.

18. The method of claim 17, where the additional journal page graphics are from a plurality of hierarchically flat sequentially arranged journal pages.

19. The method of claim 16, where the modifying the appearance includes adding graphical features to the journal page graphic that appear as one or more of crinkles, smudges, wrinkles, rips, and soiling in accordance with a cumulative duration of a time the journal page graphic has been displayed, and/or a cumulative number of touch inputs received on the surface of the display.

* * * * *